US010216542B2

(12) United States Patent
Wang et al.

(10) Patent No.: US 10,216,542 B2
(45) Date of Patent: Feb. 26, 2019

(54) RESOURCE COMPARISON BASED TASK SCHEDULING METHOD, APPARATUS, AND DEVICE

(71) Applicant: HUAWEI TECHNOLOGIES CO., LTD., Shenzhen, Guangdong (CN)

(72) Inventors: Guangming Wang, Shenzhen (CN); Hongbing Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 15/127,001

(22) PCT Filed: Mar. 17, 2014

(86) PCT No.: PCT/CN2014/073495
§ 371 (c)(1),
(2) Date: Sep. 16, 2016

(87) PCT Pub. No.: WO2015/139164
PCT Pub. Date: Sep. 24, 2015

(65) Prior Publication Data
US 2017/0109206 A1    Apr. 20, 2017

(51) Int. Cl.
*G06F 9/46* (2006.01)
*G06F 9/50* (2006.01)
*G06F 9/48* (2006.01)

(52) U.S. Cl.
CPC .......... *G06F 9/5005* (2013.01); *G06F 9/4881* (2013.01); *G06F 9/50* (2013.01)

(58) Field of Classification Search
None
See application file for complete search history.

(56) References Cited

U.S. PATENT DOCUMENTS 9,361,344 B2 * 6/2016 Murthy ............ G06F 17/30545
2008/0046500 A1   2/2008 Kato et al.
(Continued)

FOREIGN PATENT DOCUMENTS

CN   101006427 A   7/2007
CN   102096602 A   6/2011
(Continued)

OTHER PUBLICATIONS

English translation of International Search Report dated Dec. 22, 2014, in International Application No. PCT/CN2014/073495.

*Primary Examiner* — Wissam Rashid
(74) *Attorney, Agent, or Firm* — Kilpatrick Townsend & Stockton LLP

(57) ABSTRACT

Embodiments of the present invention disclose a task scheduling method, apparatus, and device, where the method includes: acquiring information about an available computing resource used for task execution; when a configured task set is received, determining resource consumption information of each task in the task set; and comparing the resource consumption information of each task in the task set with the information about the available computing resource, and determining a task that is in the task set and whose corresponding comparison result meets a preset task scheduling condition as a target task. In addition, a generated task scheduling diagram includes information such as tasks, dependence between the tasks, resource consumption information, and execution progress of a target task. By using the present invention, task scheduling can be optimized, so that task scheduling optimization is more intuitive, thereby improving processing performance of a data warehouse.

16 Claims, 10 Drawing Sheets

(56) References Cited

U.S. PATENT DOCUMENTS

| | | | |
|---|---|---|---|
| 2008/0263555 A1* | 10/2008 | Ventroux | G06F 9/4881 718/103 |
| 2009/0024563 A1* | 1/2009 | Sengar | G06F 11/3409 |
| 2009/0239480 A1* | 9/2009 | Rofougaran | H04L 12/40013 455/73 |
| 2010/0131959 A1* | 5/2010 | Spiers | G06F 9/50 718/105 |
| 2012/0291036 A1 | 11/2012 | Taira et al. | |
| 2015/0121391 A1 | 4/2015 | Wang | |

FOREIGN PATENT DOCUMENTS

| | | |
|---|---|---|
| CN | 102567084 A | 7/2012 |
| CN | 103294554 A | 9/2013 |
| CN | 103365713 A | 10/2013 |
| CN | 103377075 A | 10/2013 |

* cited by examiner

US 10,216,542 B2

RESOURCE COMPARISON BASED TASK SCHEDULING METHOD, APPARATUS, AND DEVICE

CROSS REFERENCE TO RELATED APPLICATIONS

This application is a National Stage of International Application No. PCT/CN2014/073495, filed on Mar. 17, 2014, which is hereby incorporated by reference in its entirety.

TECHNICAL FIELD

The present invention relates to the field of computer technologies, and in particular, to a task scheduling method, apparatus, and device.

BACKGROUND

A data warehouse is used to acquire information from a database, and a configured task in the data warehouse is corresponding to one or more data processing steps. Characteristics such as unidirectional dependence, independence, or a time constraint may exist between tasks. A task scheduling system is an important component of the data warehouse, and is used to schedule computing resources in the data warehouse to implement processing of the configured tasks.

An existing task scheduling process in a data warehouse is as follows: A task scheduling system drives execution of a task according to a set configured in a task deployment system by data development personnel, dependence between tasks in the set, and the like, and then after execution of each task is completed, a next task is executed sequentially or according to the dependence between the tasks, without considering a quantity of resources required by the next task, which results in low resource utilization and poor processing performance in a task executing process.

SUMMARY

Embodiments of the present invention provide a task scheduling method, apparatus, and device, which can improve data processing performance and resource utilization.

According to a first aspect of the present invention, a task scheduling method is provided, including: acquiring information about a computing resource available for task execution; determining, when a set of configured tasks is received, resource consumption information of each configured task in the set; and comparing the resource consumption information of each configured task in the set with the information about the computing resource available for task execution, and identifying a configured task that is in the set having a corresponding comparison result that meets a preset task scheduling condition as a target task.

In a first possible implementation manner, the method further includes: generating a configured task scheduling diagram according to task dependence and/or time dependence of each configured task in the set, where the configured task scheduling diagram includes a configured task tag that identifies each configured task in the set and a relationship tag that identifies the configured task dependence and/or the time dependence between tasks.

With reference to the first possible implementation manner of the first aspect, in a second possible implementation manner, the configured task scheduling diagram further includes a resource consumption information tag of each configured task in the set and execution progress of the target task determined from the set, where the resource consumption information tag is used to identify the resource consumption information of each configured task in the set, and the execution progress of the target task is obtained according to resource consumption information of the target task and currently detected information about a resource that has been consumed in a process of executing the target task.

With reference to the first aspect, or the first possible implementation manner of the first aspect, or the second possible implementation manner of the first aspect, in a third possible implementation manner, the determining, when a set of configured tasks is received, resource consumption information of each configured task in the set includes: searching a configured task resource consumption mapping table for actual resource consumption information, in a previous scheduling period, of each configured task in the set; and estimating resource consumption information, in a current scheduling period, of each configured task in the set according to the actual resource consumption information in the previous scheduling period; where The task resource consumption mapping table is preset and records the actual resource consumption information, in the previous scheduling period, that is obtained after each configured task in the set is executed in the previous scheduling period.

With reference to the first aspect, or the first possible implementation manner of the first aspect, or the second possible implementation manner of the first aspect, or the third possible implementation manner of the first aspect, in a fourth possible implementation manner, the comparing the resource consumption information of each task with the information about the computing resource available for task execution, and determining a configured task that is in the set having a corresponding comparison result that meets a preset task scheduling condition as a target task includes: comparing a resource consumption amount indicated by the resource consumption information of each configured task in the set with an available-resource amount indicated by the information about the computing resource available for task execution; when a comparison result is that the resource consumption amount of the configured task is less than the available-resource amount, recording that the comparison result corresponding to the configured task meets the preset task scheduling condition; and identifying at least one task that is in the set having a recorded comparison result meets the configured task scheduling condition as a target task in the current scheduling period.

With reference to the first aspect, or the first possible implementation manner of the first aspect, or the second possible implementation manner of the first aspect, or the third possible implementation manner of the first aspect, in a fifth possible implementation manner, the comparing the resource consumption information of each task with the information about the computing resource available for task execution, and determining a configured task that is in the set having a corresponding comparison result that meets a preset task scheduling condition as a target task includes: determining, from the set according to a configured task cluster type indicated by the resource consumption information of each configured task in the set and an available-cluster type indicated by the information about the computing resource available for task execution, a configured task subset whose task cluster type matches the available-cluster type; comparing a resource consumption amount indicated by resource consumption information of a configured task in the configured task subset with an available-resource amount indicated by the information about the computing resource available for task execution; when a comparison result is that the resource consumption amount of the configured task is less than the available-resource amount, recording that the comparison result corresponding to the configured task meets the preset task scheduling condition; and using at least one task that is in the configured task subset having a comparison result that meets the configured task scheduling condition as a target task in the current scheduling period.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner, after the comparing the resource consumption information of each task with the information about the computing resource available for task execution, and determining the configured task in the set having a corresponding comparison result that meets a preset task scheduling condition as a target task, the method further includes: controlling execution of the target task determined from the set; after the execution of the target task is completed, acquiring actual resource consumption information, in the current scheduling period, of the target task; and updating, according to the actual resource consumption information in the current scheduling period, actual resource consumption information that is of the target task and is recorded in the preset task resource consumption mapping table.

With reference to the second possible implementation manner of the first aspect, in a seventh possible implementation manner, the method further includes: when a resource consumption amount indicated by the resource consumption information of each configured task in the set is greater than an available-resource amount indicated by the information about the computing resource available for task execution, sending a prompt message to prompt for optimization of the configured task; or when task execution progress generated in the configured task scheduling diagram is less than a preset threshold, sending a prompt message to prompt for optimization of the configured task.

According to a second aspect of the present invention, a configured task scheduling apparatus is provided, including: an available-computing-resource information acquiring module, a task resource consumption information determining module, and a comparing and determining module. The available-computing-resource information acquiring module can be configured to acquire information about a computing resource available for task execution. The task resource consumption information determining module can be configured to: when a set of configured tasks is received, determine resource consumption information of each configured task in the set. The comparing and determining module can be configured to: compare the resource consumption information that is of each task and is determined by the task resource consumption information determining module with the information about the computing resource available for task execution and is obtained by the available-computing-resource information acquiring module, and identify, according to a comparison result, a configured task that is in the set having a corresponding comparison result that meets a preset task scheduling condition as a target task.

With reference to the second aspect, in a first possible implementation manner, the apparatus further includes: a task scheduling diagram generating module that can be configured to generate a configured task scheduling diagram according to task dependence and/or time dependence of each configured task in the set, where the configured task scheduling diagram includes a configured task tag that identifies each configured task in the set and a relationship tag that identifies the configured task dependence and/or the time dependence between tasks.

With reference to the first possible implementation manner of the second aspect, in a second possible implementation manner, the configured task scheduling diagram generated by the task scheduling diagram generating module further includes a resource consumption information tag of each configured task in the set and execution progress of the target task determined from the set, where the resource consumption information tag is used to identify the resource consumption information of each configured task in the set, and the execution progress of the target task is obtained according to resource consumption information of the target task and currently detected information about a resource that has been consumed in a process of executing the target task.

With reference to the second aspect, or the first possible implementation manner of the second aspect, or the second possible implementation manner of the second aspect, in a third possible implementation manner, the task resource consumption information determining module includes: a searching unit and an estimating unit. The searching unit can be configured to: when the configured set is received, search a configured task resource consumption mapping table for actual resource consumption information, in a previous scheduling period, of each configured task in the set. The estimating unit can be configured to estimate resource consumption information, in a current scheduling period, of each configured task in the set according to the actual resource consumption information found by the searching unit. The task resource consumption mapping table can be preset and can be used to record the actual resource consumption information, in the previous scheduling period, that is obtained after each configured task in the set is executed in the previous scheduling period.

With reference to the second aspect, or the first possible implementation manner of the second aspect, or the second possible implementation manner of the second aspect, or the third possible implementation manner of the second aspect, in a fourth possible implementation manner, the comparing and determining module includes: a first comparing unit, a first recording unit and a first determining unit. The first comparing unit can be configured to compare a resource consumption amount indicated by the resource consumption information of each configured task in the set with an available-resource amount indicated by the information about the computing resource available for task execution. The first recording unit can be configured to: when a comparison result of the first comparing unit is that the resource consumption amount of the configured task is less than the available-resource amount, record that the comparison result corresponding to the configured task matches the preset task scheduling condition. The first determining unit can be configured to determine at least one task in the set having a comparison result recorded by the first recording unit that meets the configured task scheduling condition as a target task in the current scheduling period.

With reference to the second aspect, or the first possible implementation manner of the second aspect, or the second possible implementation manner of the second aspect, or the third possible implementation manner of the second aspect, in a fifth possible implementation manner, the comparing and determining module includes: a type matching unit, a second comparing unit, a second recording unit, and a second determining unit. The type matching unit can be configured to: compare a configured task cluster type indicated by the resource consumption information of each configured task in the set with an available-cluster type indicated by the information about the computing resource available for task execution, and determine, from the set, a configured task subset whose task cluster type matches the available-cluster type. The second comparing unit can be configured to compare a resource consumption amount indicated by resource consumption information of a configured task in the configured task subset determined by the type matching unit with an available-resource amount indicated by the information about the computing resource available for task execution. The second recording unit can be configured to: when a comparison result of the second comparing unit is that the resource consumption amount of the configured task is less than the available-resource amount, record that the comparison result corresponding to the configured task that meets the preset task scheduling condition. The second determining unit, configured to use at least one task that is in the configured task subset and whose comparison result recorded by the second recording unit meets the configured task scheduling condition as a target task in the current scheduling period.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, in a sixth possible implementation manner, the apparatus further includes: a control module, an actual-resource-consumption-information acquiring module, and an updating module. The control module can be configured to control execution of the target task determined from the set. The actual-resource-consumption-information acquiring module can be configured to: after the execution of the target task is completed under control of the control module, acquire actual resource consumption information, in the current scheduling period, of the target task. The updating module can be configured to update, according to the actual resource consumption information, in the current scheduling period, that is of the target task and is acquired by the actual-resource-information acquiring module, actual resource consumption information that is of the target task and is recorded in the preset task resource consumption mapping table.

With reference to the second possible implementation manner of the second aspect, in a seventh possible implementation manner, the apparatus further includes: a prompt message sending module, configured to: when a resource consumption amount indicated by the resource consumption information of each configured task in the set is greater than an available-resource amount indicated by the information about the computing resource available for task execution, or when task execution progress generated in the configured task scheduling diagram is less than a preset threshold, send a prompt message to modify dependence of the configured task.

According to a third aspect of the present invention, a computer storage medium is provided, where the computer storage medium may store a program, and when the program is executed, some or all of steps in the task scheduling method provided in the first aspect are performed.

According to a fourth aspect of the present invention, a configured task scheduling device is provided, including a processor and a communications interface, where the communications interface is configured to receive a set of configured tasks and information about a computing resource available for task execution that are in a data warehouse; and the processor is configured to: acquire the information about the computing resource available for task execution; when the configured set is received, determine resource consumption information of each configured task in the set; and compare the resource consumption information of each configured task in the set with the information about the computing resource available for task execution, and determine a configured task that the set having a corresponding comparison result that meets a preset task scheduling condition as a target task.

With reference to the fourth aspect, in a first possible implementation manner, the processor is further configured to: generate a configured task scheduling diagram according to task dependence and/or time dependence of each configured task in the set, where the configured task scheduling diagram includes a configured task tag that identifies each configured task in the set and a relationship tag that identifies the configured task dependence and/or the time dependence between tasks.

With reference to the first possible implementation manner of the fourth aspect, in a second possible implementation manner, the configured task scheduling diagram generated by the processor further includes a resource consumption information tag of each configured task in the set and execution progress of the target task determined from the set, where the resource consumption information tag is used to identify the resource consumption information of each configured task in the set, and the execution progress of the target task is obtained according to resource consumption information of the target task and currently detected information about a resource that has been consumed in a process of executing the target task.

With reference to the fourth aspect, or the first possible implementation manner of the fourth aspect, or the second possible implementation manner of the fourth aspect, in a third possible implementation manner, the processor is specifically configured to: search a configured task resource consumption mapping table for actual resource consumption information, in a previous scheduling period, of each configured task in the set; and estimate resource consumption information, in a current scheduling period, of each configured task in the set according to the actual resource consumption information; where The task resource consumption mapping table is preset and records the actual resource consumption information, in the previous scheduling period, that is obtained after each configured task in the set is executed in the previous scheduling period.

With reference to the fourth aspect, or the first possible implementation manner of the fourth aspect, or the second possible implementation manner of the fourth aspect, or the third possible implementation manner of the fourth aspect, in a fourth possible implementation manner, the processor is specifically configured to: compare a resource consumption amount indicated by the resource consumption information of each configured task in the set with an available-resource amount indicated by the information about the computing resource available for task execution; when a comparison result indicates that the resource consumption amount of the configured task is less than the available-resource amount, record that the comparison result corresponding to the configured task meets the preset task scheduling condition;

and determine at least one task that is in the set having a recorded comparison result that meets the configured task scheduling condition as a target task in the current scheduling period.

With reference to the fourth aspect, or the first possible implementation manner of the fourth aspect, or the second possible implementation manner of the fourth aspect, or the third possible implementation manner of the fourth aspect, in a fifth possible implementation manner, the processor is further configured to: determine, from the set according to a configured task cluster type indicated by the resource consumption information of each configured task in the set and an available-cluster type indicated by the information about the computing resource available for task execution, a configured task subset having a task cluster type that matches the available-cluster type; compare a resource consumption amount indicated by resource consumption information of a configured task in the configured task subset with an available-resource amount indicated by the information about the computing resource available for task execution; when a comparison result indicates that the resource consumption amount of the configured task is less than the available-resource amount, record that the comparison result corresponding to the configured task that meets the preset task scheduling condition; and use at least one task that is in the configured task subset having a comparison result that meets the configured task scheduling condition as a target task in the current scheduling period.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, in a sixth possible implementation manner, the processor is further configured to: control execution of the target task determined from the set; after the execution of the target task is completed, acquire actual resource consumption information, in the current scheduling period, of the target task; and update, according to the actual resource consumption information in the current scheduling period, actual resource consumption information that is of the target task and is recorded in the preset task resource consumption mapping table.

With reference to the second possible implementation manner of the fourth aspect, in a seventh possible implementation manner, the processor is further configured to: when a resource consumption amount indicated by the resource consumption information of each configured task in the set is greater than an available-resource amount indicated by the information about the computing resource available for task execution, send a prompt message to prompt for optimization of the configured task; or when task execution progress displayed in the configured task scheduling diagram is less than a preset threshold, send a prompt message to prompt for optimization of the configured task.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect, in an eighth possible implementation manner, the device further includes a display, where the display is configured to display a result of execution by the processor.

It can be learned from the above that, in some feasible implementation manners of the present invention, information about a computing resource available for task execution is acquired; resource consumption information of each task in a set is determined; and the resource consumption information is compared with the information about the computing resource available for task execution, and a configured task whose comparison result meets a preset task scheduling condition is determined as a target task, thereby improving resource utilization in a configured task scheduling process, and improving processing performance of a data warehouse.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
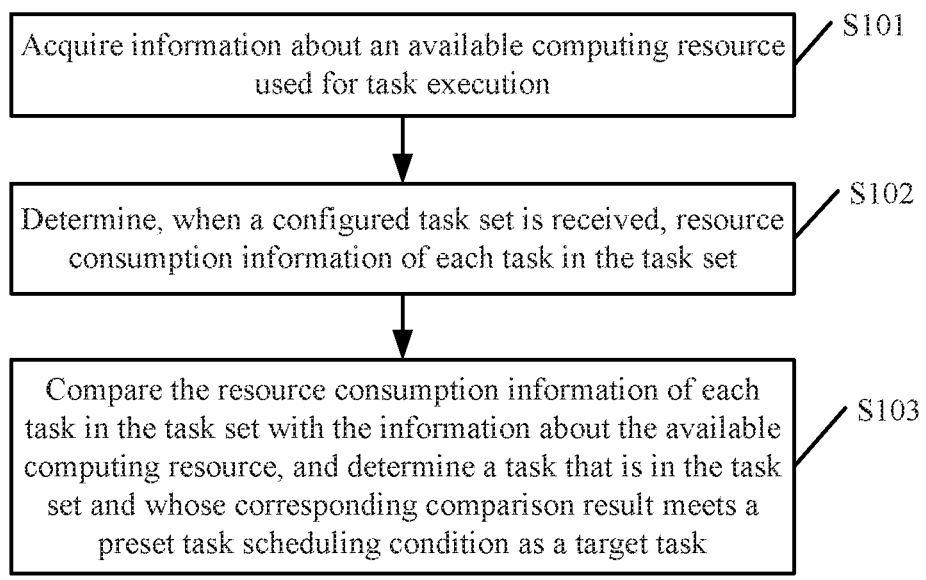
FIG. 1 is a schematic flowchart of a task scheduling method according to an embodiment of the present invention.

Referring to FIG. 1, FIG. 1 is a schematic flowchart of a task scheduling method according to an embodiment of the present invention. The method may be applied to a data warehouse and a cloud computing system, and may be specifically implemented by a device or a server that performs task scheduling. The method in this embodiment of the present invention specifically includes:

S101. Acquire information about a computing resource available for task execution.

In this embodiment of the present invention, this step may be specifically: acquiring information about a current available computing resource of a data warehouse from a resource monitoring system integrated in the data warehouse (the resource monitoring system may deploy an overall-resource monitoring agent in the data warehouse, where the overall-resource monitoring agent is used to monitor all available computing resources in a data warehouse cluster). An available-resource amount indicated by the information about the computing resource available for task execution may be determined according to a CPU usage status, available memory space, and the like. In addition, if the available-resource amount in the data warehouse includes different functional cluster types, such as source data receiving, batch data processing, real-time data processing, and data transmission, that is, a different type of task is executed in each cluster, the information about the computing resource available for task execution not only indicates the available-resource amount, but also indicates a functional cluster type corresponding to the available-resource amount.

S102. Determine, when a set of configured tasks is received, resource consumption information of each configured task in the set.

Specifically, a user may complete task deployment and configuration by using a task deployment system, and then the task deployment system deploys, at a local end, tasks and information such as dependence between the configured tasks. That is, a set that is configured by the task deployment system and is received at the local end, where the set includes the configured tasks and the dependence between the configured tasks.

Optionally, the determining resource consumption information of each configured task in the set can include: acquiring resource consumption, in a previous scheduling period, of each configured task in the set from the resource monitoring system of the data warehouse (the resource monitoring system deploys a configured task resource monitoring agent in the data warehouse cluster, where the configured task resource monitoring agent may be specifically developed according to various task types and is configured to monitor a computing resource consumed by each task), and then estimating resource consumption information, in a current scheduling period, of each configured task. Specifically, because resources consumption in adjacent scheduling periods of a same task is roughly equal, the resource consumption amount, in the previous scheduling period, of each task may be used as the resource consumption information, in the current scheduling period, of each task.

Optionally, resource consumption information, in the previous scheduling period, of each configured task in the set may also be obtained by searching a task resource consumption mapping table stored at the local end, where the task resource consumption mapping table is preset and records actual resource consumption information, in the previous scheduling period, that is obtained after each configured task in the set is executed in the previous scheduling period.

S103. Compare the resource consumption information of each configured task in the set with the information about the computing resource available for task execution, and identifying a configured task in the set having a corresponding comparison result that meets a preset task scheduling condition as a target task.

Optionally, the comparing the resource consumption information of each configured task in the set with the information about the computing resource available for task execution can include: comparing a resource consumption amount indicated by the resource consumption information with an available-resource amount indicated by the information about the computing resource available for task execution; for a configured task whose comparison result is that a resource consumption amount of the configured task is less than the available-resource amount, recording that the comparison result of the configured task meets the preset task scheduling condition; and using at least one task whose comparison result meets the preset task scheduling condition as the target task.

The configured task scheduling condition is: scheduling only a configured task whose resource consumption amount is less than the available-resource amount.

In addition, when the available-resource amount includes different functional cluster types, S103 further includes: performing matching according to a configured task cluster type indicated by the resource consumption information of each configured task in the set and an available-cluster type (that is, an available-cluster type corresponding to the foregoing available-resource amount) indicated by the information about the computing resource available for task execution; and obtaining, from the set by means of matching, at least one task whose task cluster type matches the available-cluster type. The at least one task constitutes a configured task subset.

At least one task that is in the configured task subset obtained by means of matching and whose resource consumption amount indicated by resource consumption information of the configured task is less than the available-resource amount indicated by the computing resource available for task execution is used as the target task.

In this embodiment of the present invention, information about a computing resource available for task execution is acquired; resource consumption information of each task in a set is determined; and the resource consumption information is compared with the information about the computing resource available for task execution, and a configured task whose comparison result meets a preset task scheduling condition is determined as a target task. In the method, task scheduling is performed according to the information about the computing resource available for task execution, thereby improving resource utilization, and improving processing performance of a data warehouse.

Figure 2A:
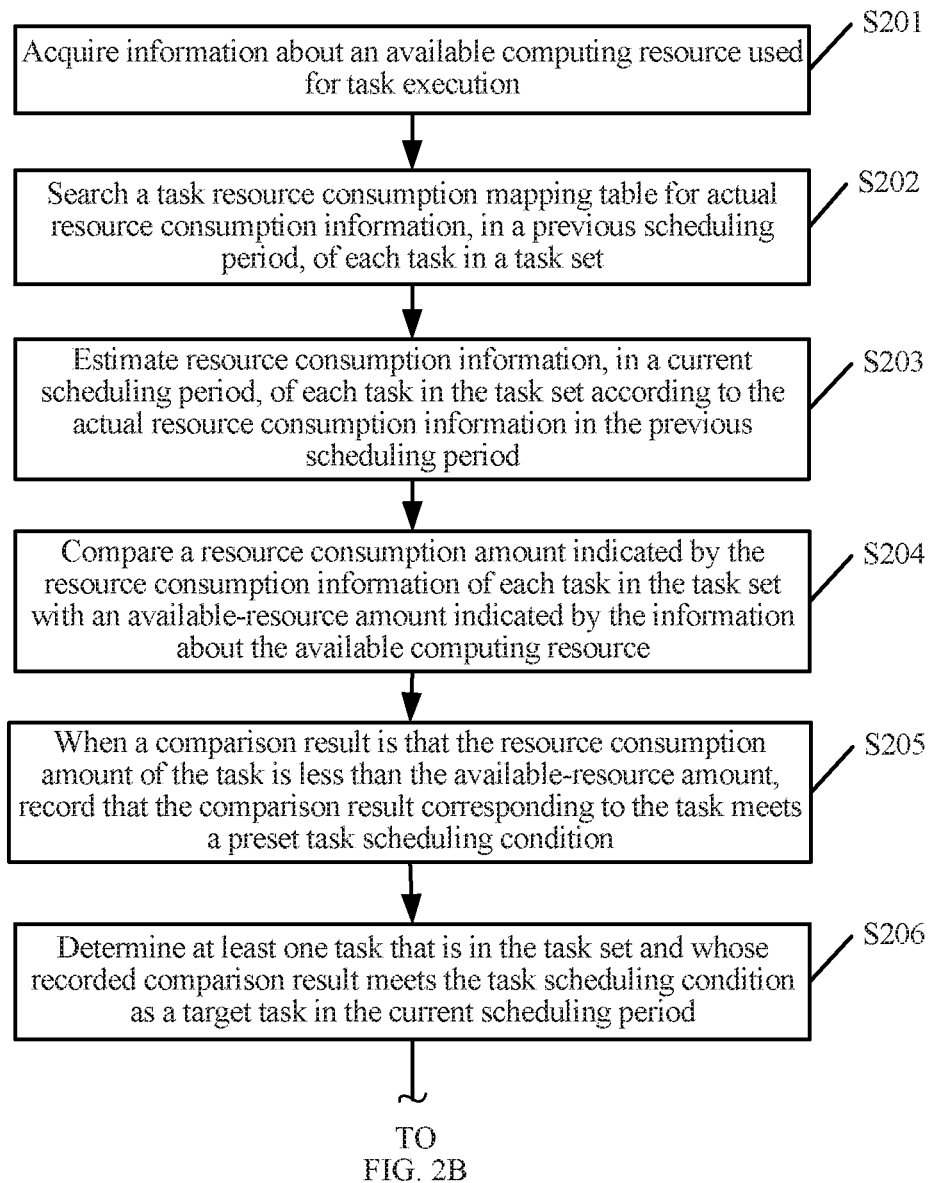
FIG. 2A and FIG. 2B are a schematic flowchart of another task scheduling method according to an embodiment of the present invention.
Figure 2B:
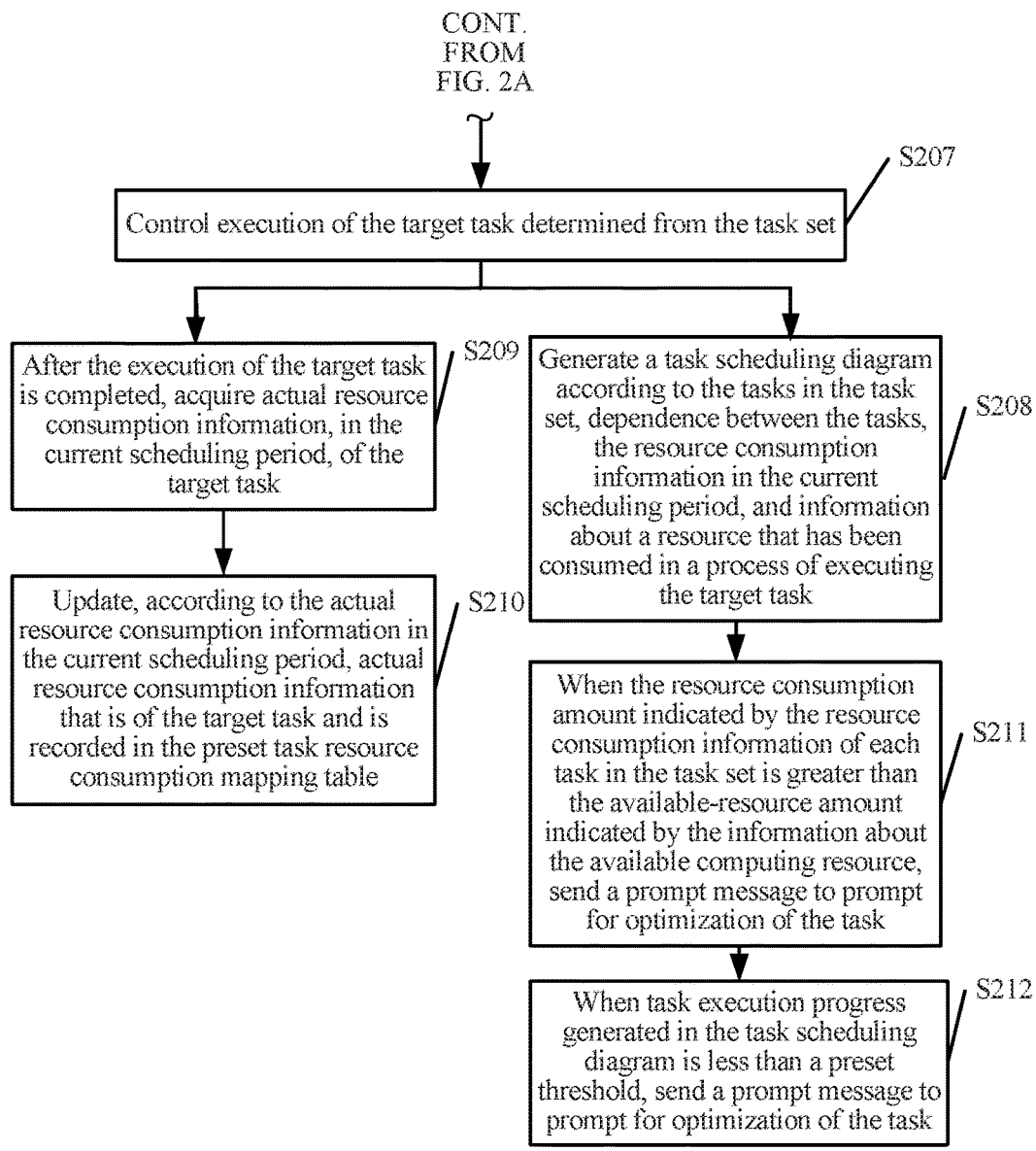

FIG. 2A and FIG. 2B are a schematic flowchart of another task scheduling method according to an embodiment of the present invention. The method may be applied to a data warehouse or a cloud computing system, and may be specifically implemented by a device or a server that performs task scheduling. The method specifically includes:

S201. Acquire information about a computing resource available for task execution.

Actions performed in this step are the same as those in S101 in the foregoing embodiment, and details are not repeatedly described herein.

S202. Search a task resource consumption mapping table for actual resource consumption information, in a previous scheduling period, of each task in a set.

The task resource consumption mapping table is preset and records the actual resource consumption information, in the previous scheduling period, that is obtained after each configured task in the set is executed in the previous scheduling period. The actual resource consumption information in the task resource consumption mapping table may be acquired from a resource monitoring system, or is directly acquired from a configured task resource monitoring agent deployed in a data warehouse cluster by a resource monitoring system.

S203. Estimate resource consumption information, in a current scheduling period, of each configured task in the set according to the actual resource consumption information in the previous scheduling period.

S204. Compare a resource consumption amount indicated by the resource consumption information of each configured task in the set with an available-resource amount indicated by the information about the computing resource available for task execution.

S205. When a comparison result is that the resource consumption amount of the configured task is less than the available-resource amount, record that the comparison result corresponding to the configured task meets a preset task scheduling condition.

S206. Determine at least one task that is in the set having a recorded comparison result that meets the configured task scheduling condition as a target task in the current scheduling period.

S207. Control execution of the target task determined from the set.

S208. Generate a configured task scheduling diagram according to the configured tasks in the set, dependence between the configured tasks, the resource consumption information in the current scheduling period, and information about a resource that has been consumed in a process of executing the target task.

The configured task scheduling diagram includes a configured task tag that identifies each configured task in the set, a relationship tag that identifies task dependence and/or time dependence between the configured tasks, a resource consumption information tag of each configured task in the set, and execution progress of the target task determined from the set.

The resource consumption information tag is used to identify the resource consumption information of each configured task in the set, and the execution progress of the target task is obtained according to resource consumption information of the target task and the currently detected information about the resource that has been consumed in the process of executing the target task.

Optionally, the configured task scheduling diagram may be generated when the set is received (in this case, the configured task scheduling diagram includes the configured task tags and dependence tags). In a configured task scheduling process, the resource consumption information tag of each configured task in the set is generated, and then, the execution progress of the target task is generated when the to-be-scheduled target task is determined. A local end may send the configured task scheduling diagram including these pieces of information to a terminal for displaying, so that development or maintenance personnel monitor or manage the configured task scheduling process in real time.

S209. After the execution of the target task is completed, acquire actual resource consumption information, in the current scheduling period, of the target task.

Optionally, the acquiring actual resource consumption information, in the current scheduling period, of the target task may be acquiring the actual resource consumption information from the resource monitoring system, or is directly acquired from the configured task resource monitoring agent deployed in the data warehouse cluster by the resource monitoring system.

S210. Update, according to the actual resource consumption information in the current scheduling period, actual resource consumption information that is of the target task and is recorded in the preset task resource consumption mapping table.

S211. When the resource consumption amount indicated by the resource consumption information of each configured task in the set is greater than the available-resource amount indicated by the information about the computing resource available for task execution, send a prompt message to prompt for optimization of the configured task.

S212. When task execution progress generated in the configured task scheduling diagram is less than a preset threshold, send a prompt message to prompt for optimization of the configured task.

In steps S211 and S212, the sending a prompt message to prompt for optimization of the configured task may be specifically: prompting by changing a color tag and the like of the configured task in the configured task scheduling diagram, or prompting, in a manner of popping up an alarm prompt box, the development personnel or the maintenance personnel to maintain the configured task.

In this embodiment of the present invention, information about a computing resource available for task execution is acquired; resource consumption information of each task in a set is determined; and the information about the computing resource available for task execution is compared with the resource consumption information, and at least one task whose comparison result meets a preset task scheduling condition is determined as a target task. In addition, in a process of executing the target task, execution progress of the target task may be generated and displayed in a generated task scheduling diagram, thereby providing an intuitive basis for optimizing task scheduling, and improving processing performance of a data warehouse.

Figure 3A:
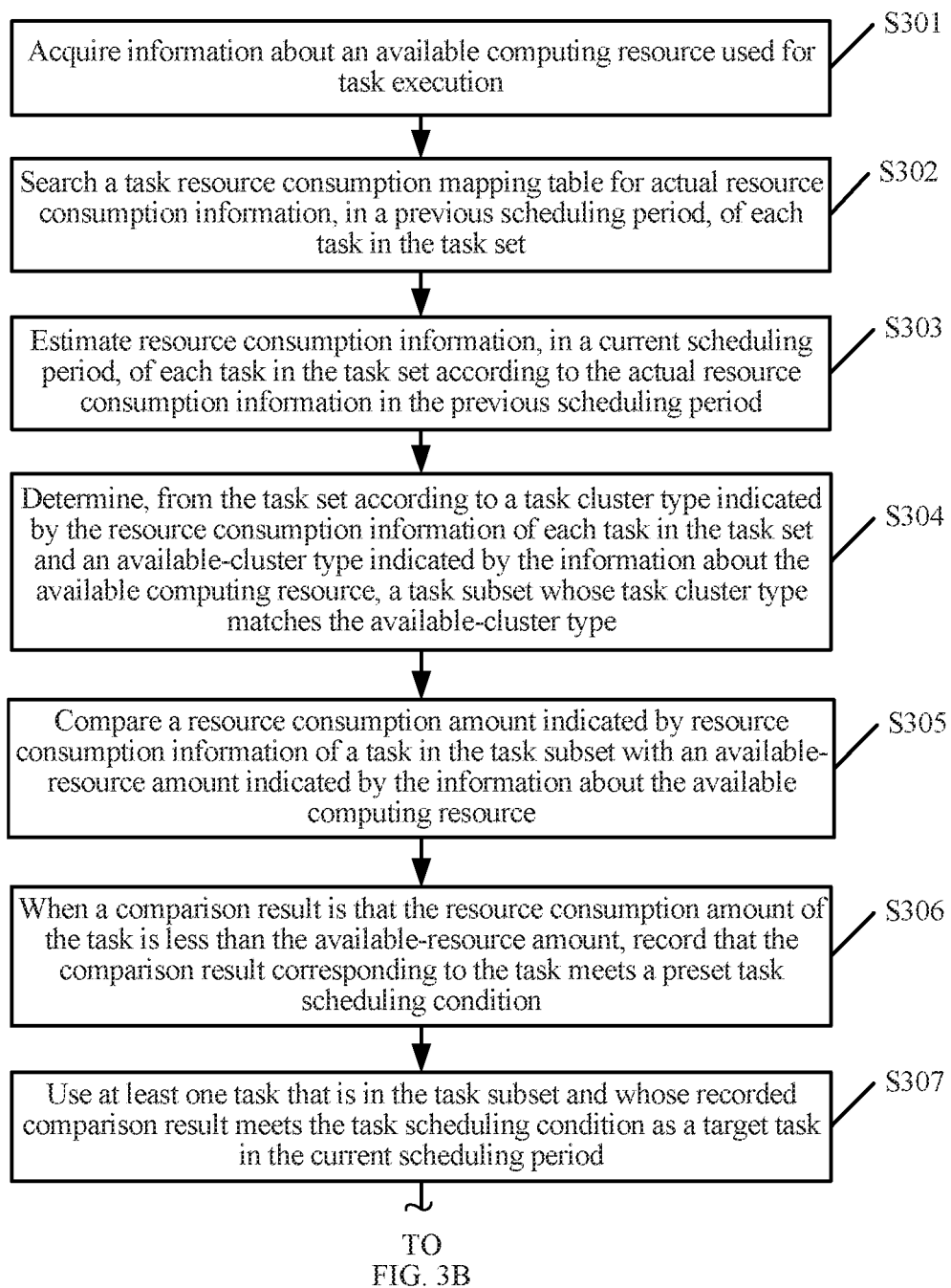
FIG. 3A and FIG. 3B are a schematic flowchart of still another task scheduling method according to an embodiment of the present invention.
Figure 3B:
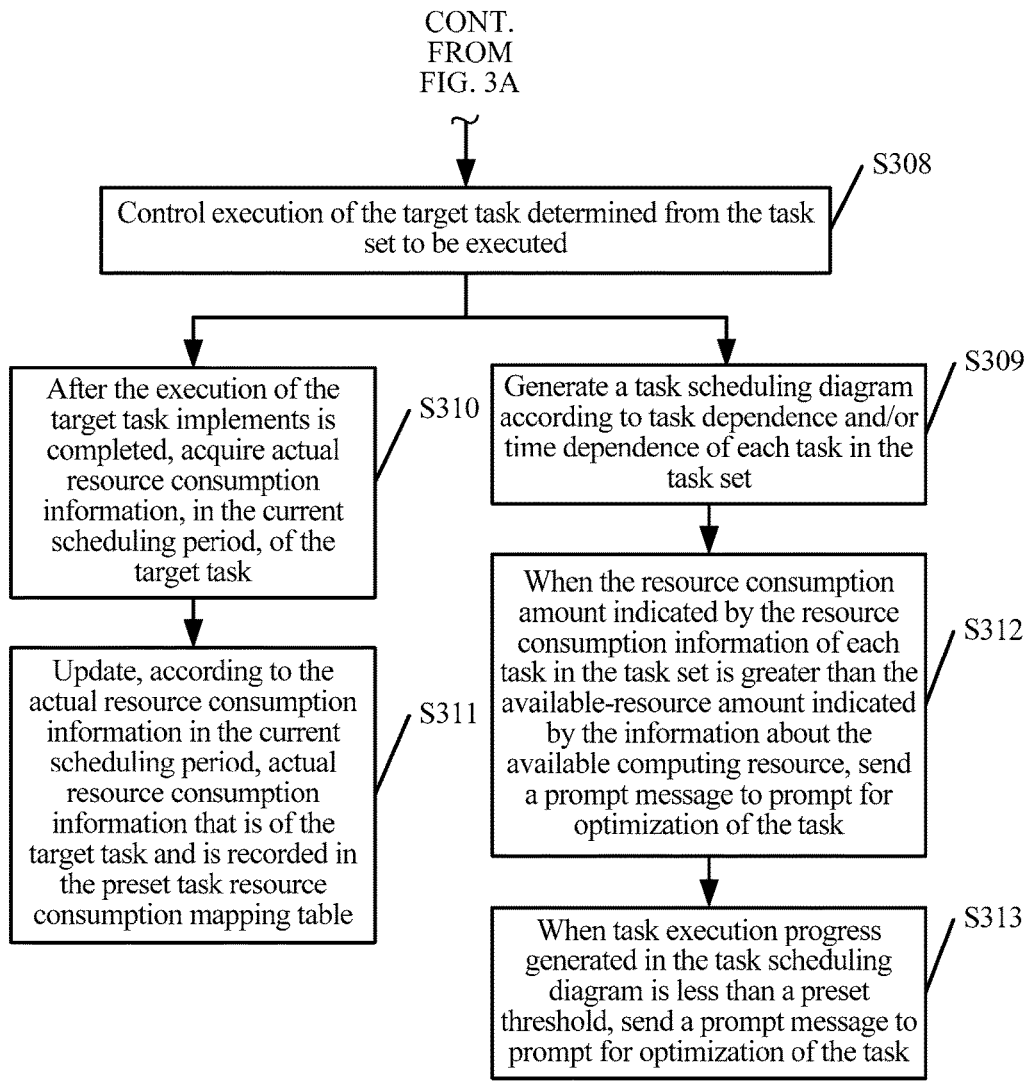

FIG. 3A and FIG. 3B are a schematic flowchart of still another task scheduling method according to an embodiment of the present invention. The method may be applied to a data warehouse or a cloud computing system, and may be specifically implemented by a device or a server that performs task scheduling. Steps S301 to S303 in the method in this embodiment of the present invention are the same as S201 to S203 in the foregoing embodiment, and details are not repeatedly described herein.

When the information about the computing resource available for task execution includes different functional cluster types, in the method in this embodiment of the present invention, the following steps are performed:

S304. Determine, from the set according to a configured task cluster type indicated by the resource consumption information of each configured task in the set and an available-cluster type indicated by the information about the computing resource available for task execution, a configured task subset having a task cluster type matches the available-cluster type.

A quantity of tasks in the configured task subset may be less than or equal to the set.

S305. Compare a resource consumption amount indicated by resource consumption information of a configured task in the configured task subset with an available-resource amount indicated by the information about the computing resource available for task execution.

S306. When a comparison result is that the resource consumption amount of the configured task is less than the available-resource amount, record that the comparison result corresponding to the configured task meets a preset task scheduling condition.

S307. Use at least one task that is in the configured task subset having a recorded comparison result that meets the configured task scheduling condition as a target task in the current scheduling period.

S308. Control execution of the target task determined from the set.

S309. Generate a configured task scheduling diagram according to task dependence and/or time dependence of each configured task in the set.

The configured task scheduling diagram includes a configured task tag that identifies each configured task in the set and a relationship tag that identifies the configured task dependence and/or the time dependence between tasks.

The configured task scheduling diagram further includes a resource consumption information tag of each configured task in the set and execution progress of the target task determined from the set, where the resource consumption information tag is used to identify the resource consumption information of each configured task in the set, and the execution progress of the target task is obtained according to resource consumption information of the target task and currently detected information about a resource that has been consumed in a process of executing the target task.

S310 to S313 in this embodiment of the present invention are the same as steps S209 to S212 in the foregoing embodiment of the present invention, and details are not repeatedly described herein.

In this embodiment of the present invention, when information about an available computing resource includes different functional cluster types, a configured task subset in which a resource consumption functional cluster type indicated by resource consumption information of a configured task matches the available-functional-cluster type is determined from the set, and then at least one target task is determined from the configured task subset, thereby improving resource utilization of a data warehouse, and improving processing performance of the data warehouse.

Optionally, in the foregoing two embodiments, a step of determining whether the available-resource information is a single functional cluster type may be added, so that the foregoing embodiments of the present invention may constitute a technical solution to optimize a configured task scheduling process and improve the processing performance.

Figure 4:
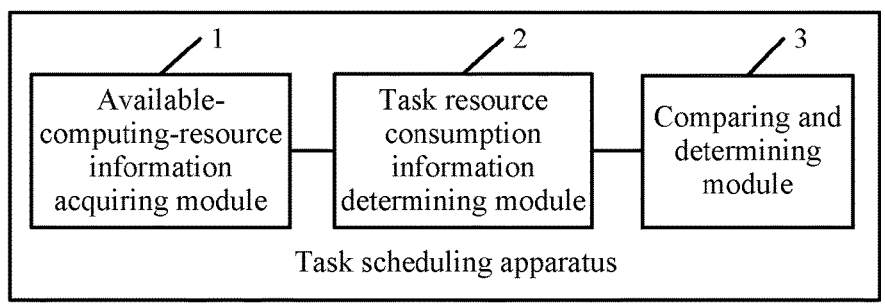
FIG. 4 is a schematic diagram of a structure of a configured task scheduling apparatus according to an embodiment of the present invention.

FIG. 4 is a schematic diagram of a structure of a configured task scheduling apparatus according to an embodiment of the present invention. The apparatus specifically includes an available-computing-resource information acquiring module 1, a task resource consumption information determining module 2, and a comparing and determining module 3.

The available-computing-resource information acquiring module 1 is configured to acquire information about a computing resource available for task execution.

In this embodiment of the present invention, the available-computing-resource information acquiring module 1 may acquire information about a current available computing resource of a data warehouse from a resource monitoring system integrated in the data warehouse. An available-resource amount indicated by the information about the computing resource available for task execution may be determined according to a CPU usage status, available memory space, and the like. In addition, if the data warehouse includes different functional cluster types, such as source data receiving, batch data processing, real-time data processing, and data transmission, that is, a different type of task is executed in each cluster, the information about the computing resource available for task execution not only indicates the available-resource amount, but also indicates a functional cluster type corresponding to the available-resource amount.

The task resource consumption information determining module 2 is configured to: when a set of configured tasks is received, determine resource consumption information of each configured task in the set.

Optionally, that the task resource consumption information determining module 2 determines resource consumption information of each configured task in the set is specifically as follows: first, the task resource consumption information determining module 2 acquires a resource consumption amount, in a previous scheduling period, of each configured task in the set from a configured task resource monitoring agent deployed in the data warehouse, and then, the task resource consumption information determining module 2 estimates resource consumption information, in a current scheduling period, of each task. Because amounts of resources consumed by a same task in adjacent scheduling periods are roughly equal, the resource consumption amount, in the previous scheduling period, of each task may be used as the resource consumption information, in the current scheduling period, of each task.

Optionally, resource consumption information, in the previous scheduling period, of each configured task in the set may be obtained by the task resource consumption information determining module 2 by searching a configured task resource consumption mapping table, where The task resource consumption mapping table is preset and records actual resource consumption information, in the previous scheduling period, that is obtained after each configured task in the set is executed in the previous scheduling period.

The comparing and determining module 3 is configured to: compare the resource consumption information that is of each task and is determined by the task resource consumption information determining module 2 with the information that is about the computing resource available for task execution and is obtained by the available-computing-resource information acquiring module 1, and determine, according to a comparison result, a configured task that is in the set having a corresponding comparison result that meets a preset task scheduling condition as a target task.

Optionally, that the comparing and determining module 3 compares the resource consumption information of each configured task in the set with the information about the computing resource available for task execution is specifically: comparing a resource consumption amount indicated by the resource consumption information with an available-resource amount indicated by the information about the computing resource available for task execution; for a configured task whose comparison result is that a resource consumption amount of the configured task is less than the available-resource amount, recording that the comparison result of the configured task meets the preset task scheduling condition; and using at least one task whose comparison result meets the preset task scheduling condition as the target task.

The configured task scheduling condition is: scheduling only a configured task whose resource consumption amount is less than the available-resource amount.

In addition, when the available-resource amount includes different functional clusters, the comparing and determining module 3 further performs matching according to a configured task cluster type indicated by the resource consumption information of each configured task in the set and an available-cluster type (that is, an available-cluster type corresponding to the foregoing available-resource amount) indicated by the information about the computing resource available for task execution, and determines, from the set, at least one task whose task cluster type matches the cluster type. The at least one task constitutes a configured task subset.

The comparing and determining module 3 uses at least one task in the configured task subset obtained by means of matching having a resource consumption amount indicated by resource consumption information of the configured task is less than the available-resource amount indicated by the computing resource available for task execution as the target task.

In this embodiment of the present invention, an available-computing-resource information acquiring module 1 acquires information about a computing resource available for task execution; a task resource consumption information determining module 2 determines resource consumption information of each task in a set; and a comparing and determining module 3 compares the resource consumption information with the information about the computing resource available for task execution, and determines a configured task whose comparison result meets a preset task scheduling condition as a target task. Task scheduling is performed according to the information about the computing resource available for task execution, thereby improving resource utilization, and improving processing performance of a data warehouse.

Figure 5:
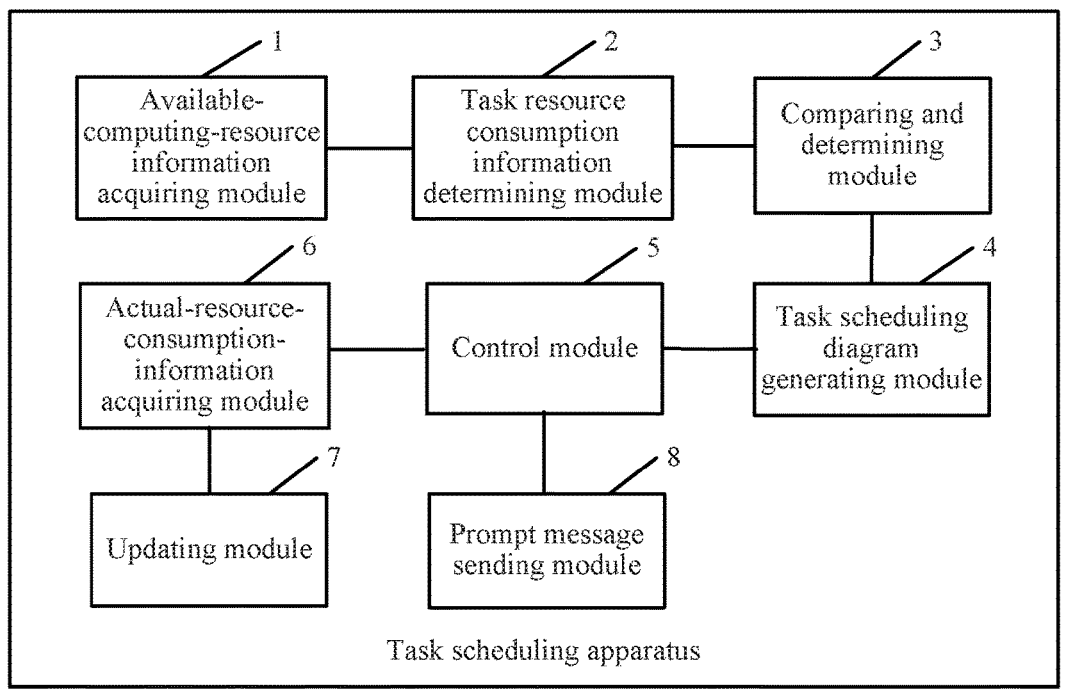
FIG. 5 is a schematic diagram of a structure of another task scheduling apparatus according to an embodiment of the present invention.

FIG. 5 is a schematic diagram of a structure of another task scheduling apparatus according to an embodiment of the present invention. In addition to the available-computing-resource information acquiring module 1, the task resource consumption information determining module 2, and the comparing and determining module 3, the apparatus further includes: a task scheduling diagram generating module 4. The task scheduling diagram generating module 4 can be configured to generate a configured task scheduling diagram according to task dependence and/or time dependence of each configured task in the set, where the configured task scheduling diagram includes a configured task tag that identifies each configured task in the set and a relationship tag that identifies the configured task dependence and/or the time dependence between tasks.

The configured task scheduling diagram generated by the task scheduling diagram generating module 4 further includes a resource consumption information tag of each configured task in the set and execution progress of the target task determined from the set.

Optionally, the task scheduling diagram generating module 4 may be a visual module in the configured task scheduling apparatus, and generates the configured task scheduling diagram according to the configured task dependence and/or the time dependence of each configured task in the set, the resource consumption information of each configured task in the set, and the execution progress of the target task determined from the set, so that these pieces of information may be intuitively viewed in a configured task scheduling process.

Figure 6:
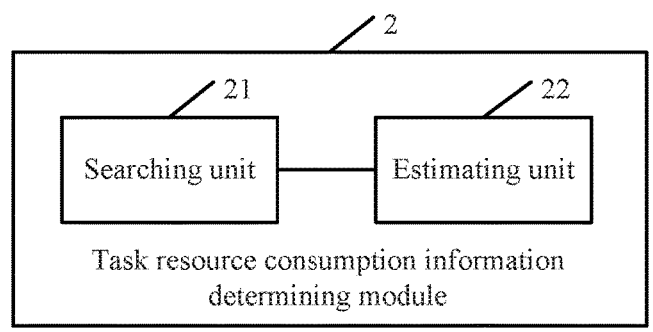
FIG. 6 is a specific schematic diagram of a structure of a task resource consumption information determining module in FIG. 5.

As shown in FIG. 6, the task resource consumption information determining module 2 includes: a searching unit 21 and an estimating unit 22. The searching unit 21 can be configured to: when the configured set is received, search a configured task resource consumption mapping table for actual resource consumption information, in a previous scheduling period, of each configured task in the set.

The estimating unit 22 can be configured to estimate resource consumption information, in a current scheduling period, of each configured task in the set according to the actual resource consumption information found by the searching unit. The configured task resource consumption mapping table is preset and records the actual resource consumption information, in the previous scheduling period, that is obtained after each configured task in the set is executed in the previous scheduling period.

Figure 7:
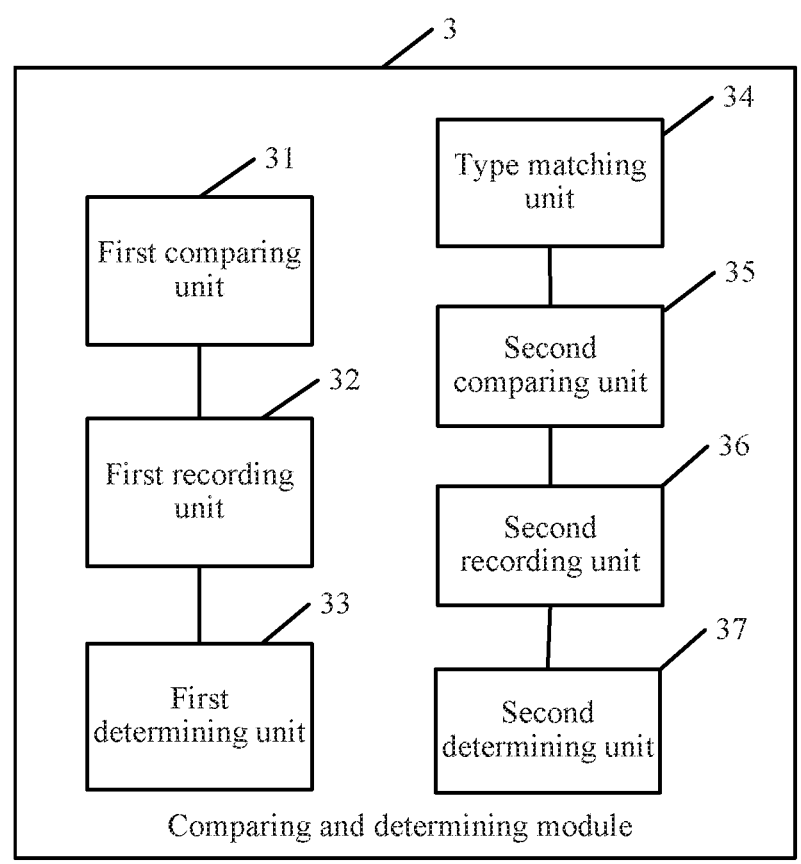
FIG. 7 is a specific schematic diagram of a structure of a comparing and determining module in FIG. 5.

As shown in FIG. 7, the comparing and determining module 3 includes: a first comparing unit 31, a first recording unit 32, and a first determining unit 33. The first comparing unit 31 can be configured to compare a resource consumption amount indicated by the resource consumption information of each configured task in the set with an available-resource amount indicated by the information about the computing resource available for task execution. The first recording unit 32 can be configured to: when a comparison result of the first comparing unit is that the resource consumption amount of the configured task is less than the available-resource amount, record that the comparison result corresponding to the configured task matches the preset task scheduling condition. The first determining unit 33 can be configured to determine at least one task that is in the set and whose comparison result recorded by the first recording unit meets the configured task scheduling condition as a target task in the current scheduling period.

When the available-resource amount indicated by the information about the computing resource available for task execution includes different functional cluster types, as shown in FIG. 7, the comparing and determining module 3 further includes: a type matching unit 34, a second comparing unit 35, and a second recording unit 36. The type matching unit 34 can be configured to: compare a configured task cluster type indicated by the resource consumption information of each configured task in the set with an available-cluster type indicated by the information about the computing resource available for task execution, and determine, from the set, a configured task subset whose task cluster type matches the available-cluster type. The second comparing unit 35, configured to compare a resource consumption amount indicated by resource consumption information of a configured task in the configured task subset determined by the type matching unit with an available-resource amount indicated by the information about the computing resource available for task execution. The second recording unit 36 can be configured to: when a comparison result of the second comparing unit is that the resource consumption amount of the configured task is less than the available-resource amount, record that the comparison result corresponding to the configured task meets the preset task scheduling condition. The second determining unit 37, configured to use at least one task that is in the configured task subset and whose comparison result recorded by the second recording unit meets the configured task scheduling condition as a target task in the current scheduling period.

Optionally, the apparatus further includes: a control module 5, an actual-resource-consumption-information acquiring module 6, and an updating module 7. The control module 5 can be configured to control execution of the target task determined from the set. The actual-resource-consumption-information acquiring module 6 can be configured to: after the execution of the target task is completed under control of the control module, acquire actual resource consumption information, in the current scheduling period, of the target task. The updating module 7 can be configured to update, according to the actual resource consumption information, in the current scheduling period, that is of the target task and is acquired by the actual-resource-information acquiring module, actual resource consumption information that is of the target task and is recorded in the preset task resource consumption mapping table.

Optionally, the apparatus further includes: a prompt message sending module 8, configured to: when a resource consumption amount indicated by the resource consumption information of each configured task in the set is greater than an available-resource amount indicated by the information about the computing resource available for task execution, or when task execution progress generated in the configured task scheduling diagram is less than a preset threshold, send a prompt message to prompt for modification of the configured task or dependence of the configured task.

In this embodiment of the present invention, a comparing and determining module 3 determines at least one target task from a set by comparing a result of an available-computing-resource information acquiring module 1 and a result of a configured task resource consumption information module 2, thereby improving resource utilization of a data warehouse, and improving processing performance of the data warehouse.

A task scheduling method in a data warehouse that is provided in an embodiment of the present invention is described with reference to FIG. 8, FIG. 9, and FIG. 10. The data warehouse is a warehouse that provides information required for online analysis and processing to a decision maker, and a relationship such as unidirectional dependence, no dependence, or different priorities may exist between tasks in the data warehouse. In terms of numerous to-be-processed tasks in the data warehouse, how to improve performance of the data warehouse and resource utilization is a key. This embodiment of the present invention provides a data warehouse system shown in FIG. 8, and the data warehouse system mainly includes a task deployment system, a data warehouse cluster, and a task scheduling system.

The task deployment system completes, in the data warehouse cluster, deployment of each task and configuration of each task, and configures, in the task scheduling system, dependence and a time sequence relationship between the configured tasks. Data development personnel or maintenance personnel may monitor and manage the deployed tasks by using an interface provided by the task deployment system. The task deployment system further deploys an overall-resource monitoring agent and a configured task resource monitoring agent in the data warehouse cluster, so as to acquire in real time information about an available computing resource in the data warehouse and resource consumption information of a configured task, and performs task scheduling for the data warehouse cluster according to any one of the task scheduling methods described in the foregoing embodiments, so that the configured tasks in the data warehouse cluster are executed with an order, and resource utilization is improved.

The task scheduling system may include the configured task scheduling apparatus described in the foregoing embodiment. In this embodiment of the present invention, in the configured task scheduling apparatus, the available-computing-resource information acquiring module is specifically configured to: complete status management of overall available-computing-resource information in the data warehouse, and keep real-time synchronization with a real resource situation of the data warehouse. The comparing and determining module is configured to manage various scheduling rules (in addition to the task scheduling methods in the foregoing embodiments of the present invention, the comparing and determining module further updates and archives a set in the data warehouse, generates various reports, and transfers the reports to a terminal for displaying), that is, the comparing and determining module is a core of the task scheduling system. After the comparing and determining module determines a to-be-scheduled target task, the control module may further control execution of the target task. A task scheduling diagram generating module in the task scheduling system further implements visualization of scheduling, that is, a configured task scheduling diagram is generated, and a configured task scheduling situation is intuitively presented to management personnel by using tasks, dependence between the configured tasks, resource consumption information of a configured task, and execution progress of the target task that are displayed in the configured task scheduling diagram. After the execution of the target task is completed, an actual-resource-consumption-information acquiring module in the task scheduling system may further acquire in real time actual resource consumption information, in a current scheduling period, of the target task. An updating module updates in real time, according to a result of the actual-resource-consumption-information acquiring module, information recorded in a configured task resource consumption mapping table. In addition, the task scheduling system further has a prompt message sending module, configured to: when a resource consumption amount indicated by the resource consumption information of each configured task in the set is greater than an available-resource amount indicated by the information about the computing resource available for task execution, or when task execution progress generated in the configured task scheduling diagram is less than a preset threshold, send a prompt message to the terminal to prompt the data development personnel or the maintenance personnel to put emphasis on optimizing the configured task.

Figure 9:
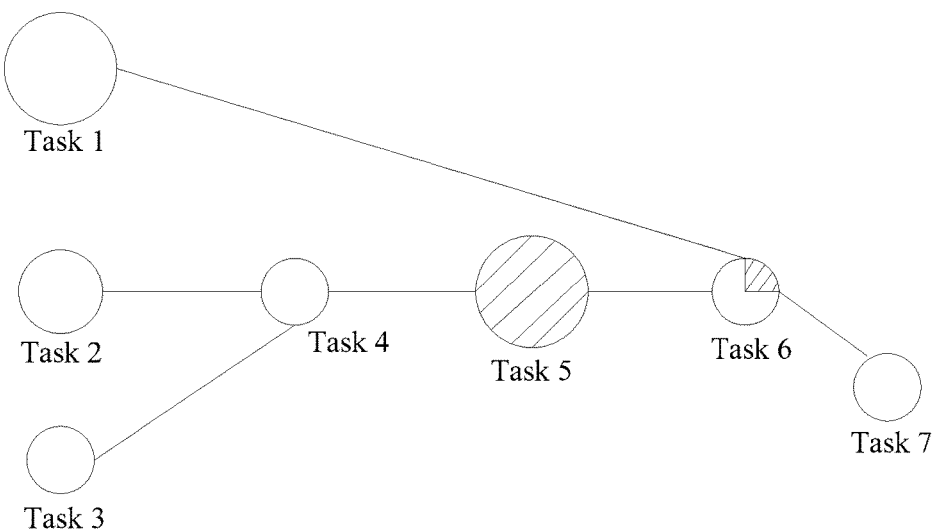
FIG. 9 is a specific task scheduling diagram according to an embodiment of the present invention.

Specifically, as shown in FIG. 9, in the configured task scheduling diagram generated by the task scheduling system, a circle may be used to represent each task, and each task may be named by using a configured task tag, such as task 1, task 2, task 3, task 4, task 5, task 6, and task 7. A connection line between tasks represents dependence between the configured tasks (a configured task arranged on the right depends on a configured task on the left), for example, execution of task 4 depends on execution results of task 2 and task 3. A size of the circle represents an estimated resource consumption amount indicated by resource consumption information of the configured task, for example, an estimated resource consumption amount of task 1 is greater than an estimated resource consumption amount of task 2. A blank or a shadow in the circle represents an execution status of the configured task. A circle that has both a blank and a shadow indicates that a target task is being executed. A ratio of the blank to the shadow represents execution progress of a configured task, for example, task 1, task 2, task 3, task 4, and task 7 are not executed, task 5 has been executed, and task 6 is being executed and a quarter of the configured task has been executed. The configured task scheduling diagram may also represent information, such as an attribute, a status, dependence, and a time sequence relationship of a configured task, in another manner.

Figure 8:
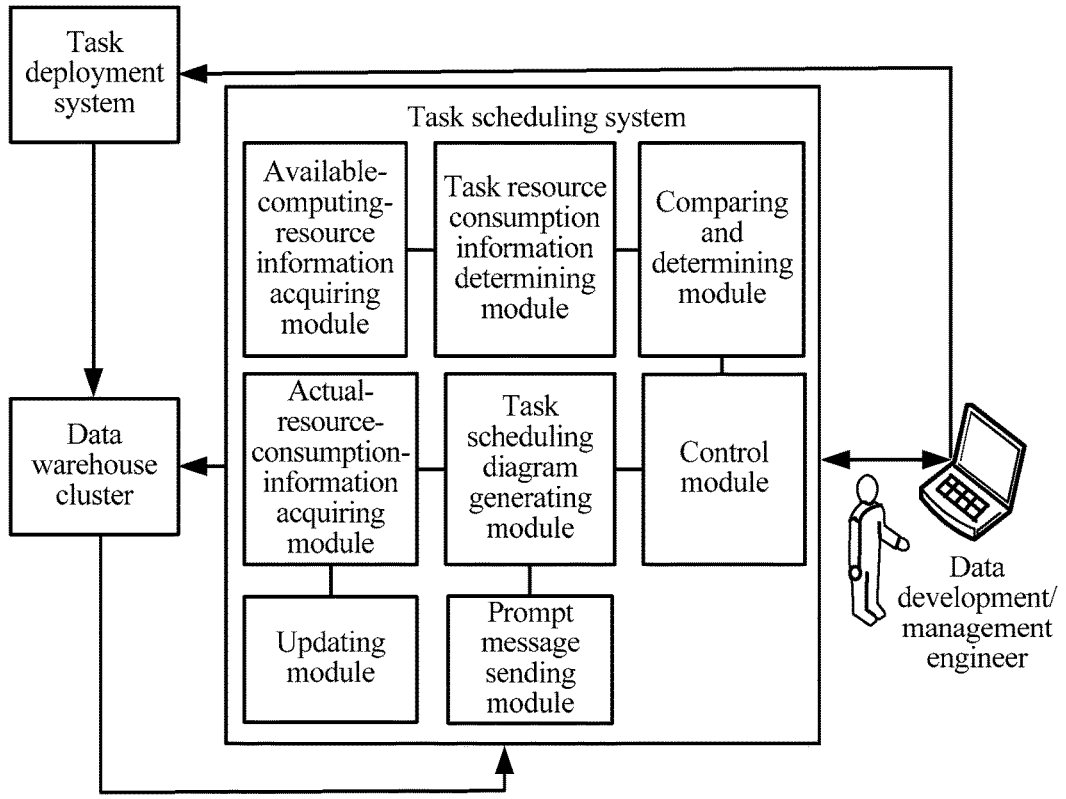
FIG. 8 is a schematic diagram of a structure of a task scheduling system of a data warehouse according to an embodiment of the present invention.
Figure 10:
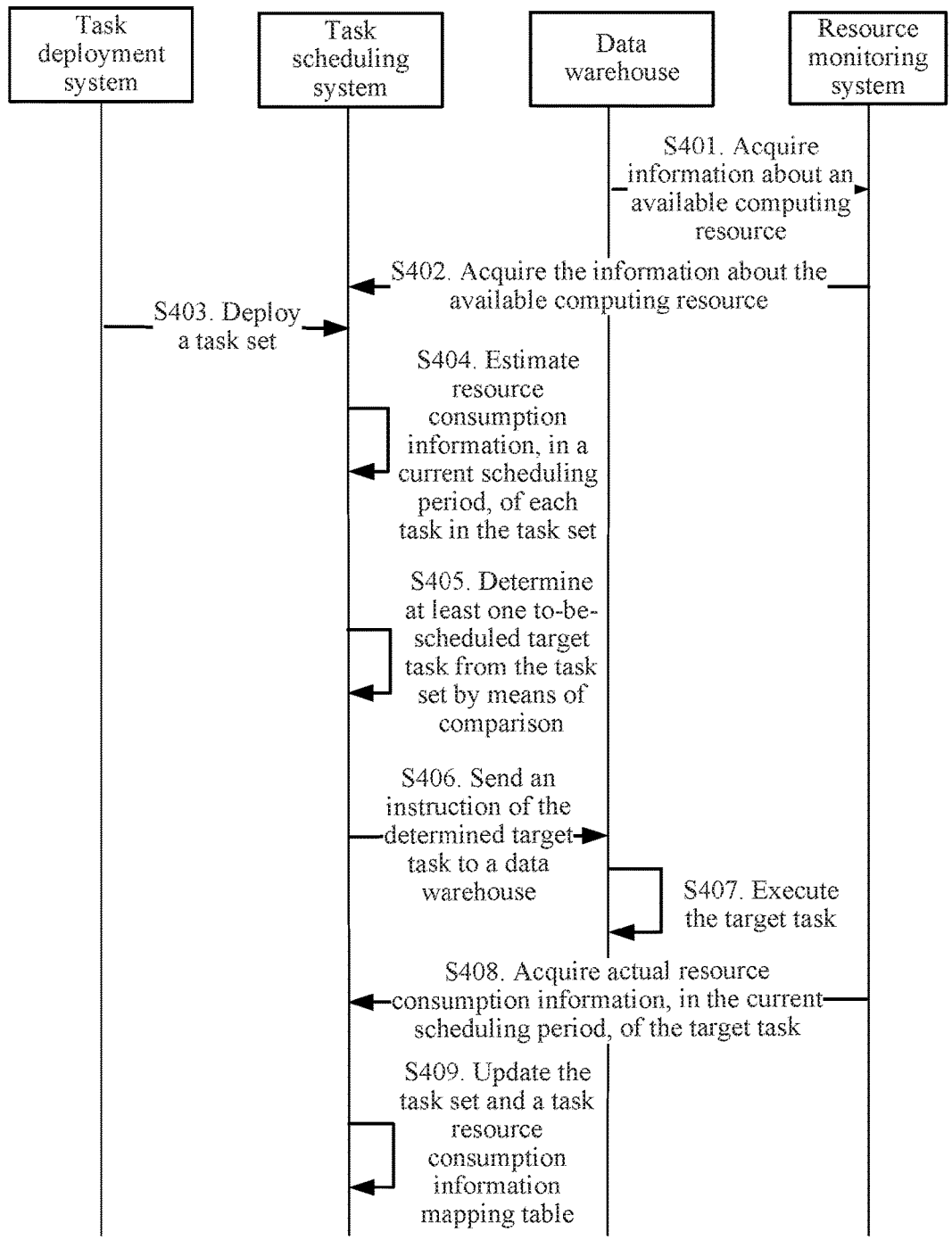
FIG. 10 is a flowchart of specific task scheduling in a data warehouse according to an embodiment of the present invention.

Based on the task scheduling system of the data warehouse in FIG. 8, as shown in FIG. 10, this embodiment of the present invention further provides a specific task scheduling procedure in the data warehouse, and the procedure includes:

S401. A resource monitoring system acquires information about a current available computing resource in a data warehouse.

S402. A task scheduling system acquires the information about the computing resource available for task execution from the resource monitoring system.

S403. Data development personnel deploy a set in the task scheduling system by using a task deployment system, where the set includes each deployed task and dependence between the configured tasks.

S404. The task scheduling system searches a configured task resource consumption information mapping table for actual resource consumption information, in a previous scheduling period, of each configured task in the set, and estimates resource consumption information, in a current scheduling period, of each configured task in the set according to the actual resource consumption information.

Optionally, the task scheduling system may also acquire in real time the actual resource consumption information, in the previous scheduling period, of each configured task in the set from the resource monitoring system.

S405. The task scheduling system determines, according to the information about the computing resource available for task execution and the actual resource consumption information, in the previous scheduling period, of each task, at least one target task that meets a preset to-be-scheduled condition.

S406. Send an instruction of the determined target task to the data warehouse.

S407. The data warehouse executes the target task.

S408. The task scheduling system acquires actual resource consumption information, in the current scheduling period, of the target task from the resource monitoring system.

S409. The task scheduling system updates the set and the configured task resource consumption information mapping table according to the target task and the actual resource consumption information, in the current scheduling period, of the target task.

Optionally, after controlling the determined target task to complete execution, the task scheduling system updates the set. Further, it may be detected, by using a preset task counter or a preset task scanner, whether there is still a configured task that is in the set and is not executed. If a detection result is that there is no task that is in the set and is not executed, task scheduling is stopped. If a detection result is that there is still a configured task that is in the set and is not executed, for the configured task that is in the updated set and is not executed, task scheduling may be started according to the task scheduling method provided in this embodiment of the present invention.

In addition, when the data warehouse adds or deletes a configured task each time, step S403 needs to be performed. When the information about the computing resource available for task execution includes different types of functional clusters, a functional cluster type of the target task determined in step S405 further needs to match an available-functional-cluster type indicated by the information about the computing resource available for task execution, for example, a configured task of big-data processing must be executed in a big-data processing cluster.

In this embodiment of the present invention, task scheduling is performed by performing matching between information about an available computing resource in a data warehouse and estimated resource consumption information of a configured task, so that computing resources can be used to a great extent, thereby improving processing performance of the data warehouse.

An embodiment of the present invention further provides a computer storage medium, where the computer storage medium may store a program, and when the program runs, some or all of steps in the task scheduling methods described in the foregoing embodiments in FIG. 1 to FIG. 3A and FIG. 3B are included.

Figure 11:
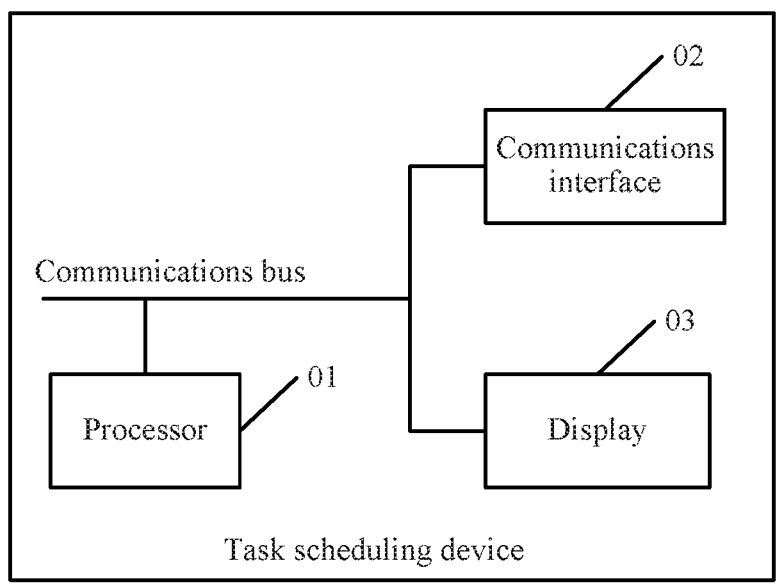
FIG. 11 is a schematic diagram of a structure of a configured task scheduling device according to an embodiment of the present invention.

Referring to FIG. 11, FIG. 11 is a schematic diagram of a structure of a configured task scheduling device according to an embodiment of the present invention. The configured task scheduling device may include a processor 01, and a communications interface 02 (there may be one or more processors 01, and one processor 01 is used as an example in FIG. 11). In some embodiments of the present invention, the processor 01 and the communications interface 02 may be connected by using a communications bus or in another manner, and a communications bus connection is used as an example in FIG. 11.

The communications interface 02 is configured to receive a set of configured tasks and information about an available computing resource that are in a data warehouse.

The processor 01 is configured to: acquire the information about the computing resource available for task execution; when the configured set is received, determine resource consumption information of each configured task in the set; and compare the resource consumption information of each configured task in the set with the information about the computing resource available for task execution, and determine a configured task that is in the set having a corresponding comparison result that meets a preset task scheduling condition as a target task.

The processor 01 is further configured to:

generate a configured task scheduling diagram according to task dependence and/or time dependence of each configured task in the set, where the configured task scheduling diagram includes a configured task tag that identifies each configured task in the set and a relationship tag that identifies the configured task dependence and/or the time dependence between tasks.

The configured task scheduling diagram generated by the processor 01 further includes a resource consumption information tag of each configured task in the set and execution progress of the target task determined from the set, where the resource consumption information tag is used to identify the resource consumption information of each configured task in the set, and the execution progress of the target task is obtained according to resource consumption information of the target task and currently detected information about a resource that has been consumed in a process of executing the target task.

The processor 01 is specifically configured to: search a configured task resource consumption mapping table for actual resource consumption information, in a previous scheduling period, of each configured task in the set; and estimate resource consumption information, in a current scheduling period, of each configured task in the set according to the actual resource consumption information; where The task resource consumption mapping table is preset and records the actual resource consumption information, in the previous scheduling period, that is obtained after each configured task in the set is executed in the previous scheduling period.

The processor 01 is specifically configured to: compare a resource consumption amount indicated by the resource consumption information of each configured task in the set with an available-resource amount indicated by the information about the computing resource available for task execution; when a comparison result is that the resource consumption amount of the configured task is less than the available-resource amount, record that the comparison result corresponding to the configured task meets the preset task scheduling condition; and determine at least one task that is in the set and whose recorded comparison result meets the configured task scheduling condition as a target task in the current scheduling period.

The processor 01 is specifically configured to: determine, from the set according to a configured task cluster type indicated by the resource consumption information of each configured task in the set and an available-cluster type indicated by the information about the computing resource available for task execution, a configured task subset whose task cluster type matches the available-cluster type; compare a resource consumption amount indicated by resource consumption information of a configured task in the configured task subset with an available-resource amount indicated by the information about the computing resource available for task execution; when a comparison result is that the resource consumption amount of the configured task is less than the available-resource amount, record that the comparison result corresponding to the configured task meets the preset task scheduling condition; and use at least one task that is in the configured task subset and whose recorded comparison result meets the configured task scheduling condition as a target task in the current scheduling period.

The processor 01 is further configured to: control execution of the target task determined from the set; after the execution of the target task is completed, acquire actual resource consumption information, in the current scheduling period, of the target task; and update, according to the actual resource consumption information in the current scheduling period, actual resource consumption information that is of the target task and is recorded in the preset task resource consumption mapping table.

The processor 01 is further configured to: when a resource consumption amount indicated by the resource consumption information of each configured task in the set is greater than an available-resource amount indicated by the information about the computing resource available for task execution, send a prompt message to prompt for optimization of the configured task; or when task execution progress displayed in the configured task scheduling diagram is less than a preset threshold, send a prompt message to prompt for optimization of the configured task.

Optionally, the configured task scheduling device described in this embodiment of the present invention further includes a display 03, where the display 03 is configured to display a result of execution by the processor 01, for example, display the configured task scheduling diagram generated by the processor 01.

In this embodiment of the present invention, information about a computing resource available for task execution is acquired; a target task that matches the information about the computing resource available for task execution is searched for according to received resource consumption information of each task, so that a configured task scheduling process is optimized; and resource consumption information and execution progress of a configured task are viewed in real time according to a generated scheduling diagram, so as to provide an intuitive basis for task scheduling optimization, thereby improving performance of a data warehouse.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A task scheduling method for scheduling tasks to be executed by a data warehouse system, the method comprising:
    scheduling, at a task scheduling system, a set of configured tasks to be executed by the data warehouse system, wherein scheduling the set of configured tasks includes:
    managing a preset task scheduling condition;
    acquiring real-time available resource information about one or more computing resources available for task execution in the data warehouse system;
    receiving, from a task deployment system, instructions to schedule the set of configured tasks;
    determining resource consumption information regarding each configured task in the set of the configured tasks;
    comparing the resource consumption information regarding each configured task in the set with the available resource information to obtain a comparison result for the configured task; and
    identifying a target task from the set of configured tasks by virtue of the target task having a corresponding comparison result that meets the preset task scheduling condition, the preset task scheduling condition specifying consumption resource regarding the target task is less than the one or more available computing resources in the data warehouse system; and
    delivering, at the task scheduling system, the target task to the task deployment system for the task deployment system to deploy the target task on the data warehouse for execution; and, wherein
    comparing the resource consumption information of each configured task with the available resource information comprises:
    determining, from the set according to a task cluster type indicated by the resource consumption information of each configured task in set and an available-cluster type indicated by the information about the computing resource available for task execution, a task subset whose task cluster type matches the available-cluster type;
    comparing a resource consumption amount indicated by resource consumption information of a configured task in the task subset with an available-resource amount indicated by the information about the computing resource available for task execution; and
    when a comparison result indicates that the resource consumption amount of the task is less than the available-resource amount, recording that the comparison result corresponding to the task meets the preset task scheduling condition; and, wherein identifying the target task from the set of the configured tasks comprises:
using at least one task in the task subset having a recorded comparison result that meets the task scheduling condition as a target task in the current scheduling period.

2. The method according to claim 1, further comprising:
generating, at the task scheduling system, a task scheduling diagram according to task dependence and/or time dependence of each configured task in the set, wherein
the task scheduling diagram comprises a task tag that identifies each configured task in the set and a relationship tag that identifies the task dependence and/or the time dependence between the configured tasks in the set.

3. The method according to claim 2, wherein the task scheduling diagram further comprises a resource consumption information tag of each configured task in the set and execution progress of the target task determined from the set, wherein
the resource consumption information tag identifies the resource consumption information of each configured task in the set, and the execution progress of the target task is obtained according to resource consumption information of the target task and currently detected information about a resource that has been consumed in a process of executing the target task.

4. The method according to claim 1, wherein determining resource consumption information regarding each configured task in the set comprises:
searching a task resource consumption mapping table for actual resource consumption information, in a previous scheduling period, of each configured task in the set; and
estimating resource consumption information, in a current scheduling period, of each configured task in the set according to the actual resource consumption information in the previous scheduling period;
wherein the task resource consumption mapping table is preset and records the actual resource consumption information, in the previous scheduling period, that is obtained after each configured task in the set is executed in the previous scheduling period.

5. The method according to claim 1, wherein comparing the resource consumption information of each configured task in the set with the available resource information comprises:
comparing a resource consumption amount indicated by the resource consumption information of each configured task in the set with an available-resource amount indicated by the information about the computing resource available for task execution; and
when a comparison result indicates that the resource consumption amount of the configured task is less than the available-resource amount, recording that the comparison result corresponding to the configured task meets the preset task scheduling condition; and, wherein identifying the target task from the set of configured tasks comprises:
identifying at least one configured task in the set having a recorded comparison result that meets the task scheduling condition as a target task in the current scheduling period.

6. The method according to claim 1, after identifying the target configured task from the set of the configured tasks, the method further comprising:
controlling execution of the target task determined from the set;
after the execution of the target task is completed, acquiring actual resource consumption information, in the current scheduling period, of the target task; and
updating, according to the actual resource consumption information in the current scheduling period, actual resource consumption information that is of the target task and is recorded in the preset task resource consumption mapping table.

7. The method according to claim 3, further comprising:
when a resource consumption amount indicated by the resource consumption information of each configured task in set is greater than an available-resource amount indicated by the information about the computing resource available for task execution, sending, at the task scheduling system, a prompt message to prompt for optimization of the configured task; and
when task execution progress generated in the task scheduling diagram is less than a preset threshold, sending, at the task scheduling system, a prompt message to prompt for optimization of the configured task.

8. A computer storage medium, wherein:
the computer storage medium may store a program, and when the program is executed, steps described in claim 1 are performed.

9. A task scheduling device, comprising a processor and a communications interface, wherein
the communications interface is configured to receive a set of configured tasks and available resource information regarding one or more computing resources in a data warehouse available for task execution; and
the processor is configured to:
schedule, at a task scheduling system, a set of configured tasks to be executed by the data warehouse system, wherein scheduling the set of configured tasks includes:
managing a preset task scheduling condition;
acquiring real-time available resource information about one or more computing resources available for task execution in the data warehouse system;
receiving, from a task deployment system, instructions to schedule the set of configured tasks;
determining resource consumption information regarding each configured task in the set of the configured tasks;
comparing the resource consumption information regarding each configured task in the set with the available resource information to obtain a comparison result for the configured task; and
identifying a target task from the set of configured tasks by virtue of the target task having a corresponding comparison result that meets the preset task scheduling condition, the preset task scheduling condition specifying consumption resource regarding the target task is less than the one or more available computing resources in the data warehouse system; and
deliver, at the task scheduling system, the target task to the task deployment system for the task deployment system to deploy the target task on the data warehouse for execution; and, wherein the processor is further configured to:
determine, from the set according to a task cluster type indicated by the resource consumption information of each configured task in the set and an available-cluster type indicated by the information about the computing resource available for task execution, a task subset whose task cluster type matches the available-cluster type;

compare a resource consumption amount indicated by resource consumption information of a configured task in the task subset with an available-resource amount indicated by the information about the computing resource available for task execution;

when a comparison result indicates that the resource consumption amount of the task is less than the available-resource amount, record that the comparison result corresponding to the task meets the preset task scheduling condition; and use at least one task in the task subset having a recorded comparison result that meets the task scheduling condition as a target task in the current scheduling period.

10. The device according to claim 9, wherein the processor is further configured to:

generate a task scheduling diagram according to task dependence and/or time dependence of each configured task in the set, wherein the task scheduling diagram comprises a task tag that identifies each configured task in the set and a relationship tag that identifies the task dependence and/or the time dependence between the configured tasks in the set.

11. The device according to claim 10, wherein the task scheduling diagram generated by the processor further comprises a resource consumption information tag of each configured task in the set and execution progress of the target task determined from the set, wherein the resource consumption information tag identifies the resource consumption information of each configured task in the set, and the execution progress of the target task is obtained according to resource consumption information of the target task and currently detected information about a resource that has been consumed in a process of executing the target task.

12. The device according to claim 9, wherein the processor is configured to:

search a task resource consumption mapping table for actual resource consumption information, in a previous scheduling period, of each configured task in the set; and estimate resource consumption information, in a current scheduling period, of each configured task in the set according to the actual resource consumption information;

wherein the task resource consumption mapping table is preset and records the actual resource consumption information, in the previous scheduling period, that is obtained after each configured task in the set is executed in the previous scheduling period.

13. The device according to claim 9, wherein the processor is configured to:

compare a resource consumption amount indicated by the resource consumption information of each configured task in the set with an available-resource amount indicated by the information about the computing resource available for task execution;

when a comparison result indicates that the resource consumption amount of the configured task is less than the available-resource amount, record that the comparison result corresponding to the configured task meets the preset task scheduling condition; and identify at least one configured task in the set having a recorded comparison result that meets the task scheduling condition as a target task in the current scheduling period.

14. The device according to claim 9, wherein the processor is further configured to:

control execution of the target task determined from the task set;

after the execution of the target task is completed, acquire actual resource consumption information, in the current scheduling period, of the target task; and update, according to the actual resource consumption information in the current scheduling period, actual resource consumption information that is of the target task and is recorded in the preset task resource consumption mapping table.

15. The device according to claim 11, wherein the processor is further configured to:

when a resource consumption amount indicated by the resource consumption information of each configured task in set is greater than an available-resource amount indicated by the information about the computing resource available for task execution, send a prompt message to prompt for optimization of the configured task; and when task execution progress displayed in the task scheduling diagram is less than a preset threshold, send a prompt message to prompt for optimization of the configured task.

16. The device according to claim 9, further comprising a display, wherein the display is configured to display a result of execution by the processor.

* * * * *